United States Patent
Danz et al.

[11] Patent Number: 5,911,770
[45] Date of Patent: Jun. 15, 1999

[54] GEAR-CHANGE CONTROL SYSTEM FOR AN AUTOMATIC TRANSMISSION

[75] Inventors: Wolfgang Danz, Friedrichshafen; Gerhard Eschrich, Tettnang; Udo Gillich, Meckenbeuren; Wolfgang Runge, Ravensburg, all of Germany

[73] Assignee: ZF Friedrichshafen AG, Friedrichshafen, Germany

[21] Appl. No.: 08/750,663

[22] PCT Filed: Jul. 15, 1995

[86] PCT No.: PCT/EP95/02790

§ 371 Date: Dec. 12, 1996

§ 102(e) Date: Dec. 12, 1996

[87] PCT Pub. No.: WO96/03600

PCT Pub. Date: Feb. 8, 1996

[30] Foreign Application Priority Data

Jul. 23, 1994 [DE] Germany .............................. 44 26 153

[51] Int. Cl.⁶ .......................... F16H 61/00; F16H 59/00; B60K 41/04
[52] U.S. Cl. .............................. 701/57; 73/118.1
[58] Field of Search ................. 701/57, 67, 68, 701/95, 87; 73/118.1, 865.9

[56] References Cited

U.S. PATENT DOCUMENTS

| | | | |
|---|---|---|---|
| 4,841,815 | 6/1989 | Takahashi et al. ........................ | 701/57 |
| 5,095,435 | 3/1992 | Tokoro et al. ............................ | 701/68 |
| 5,303,153 | 4/1994 | Sakai et al. ............................... | 701/57 |
| 5,323,318 | 6/1994 | Hasegawa et al. ........................ | 701/57 |
| 5,389,050 | 2/1995 | Sakai et al. ............................... | 701/57 |
| 5,600,557 | 2/1997 | Ogawa ...................................... | 701/57 |
| 5,748,472 | 5/1998 | Gruhle et al. ............................. | 701/57 |
| 5,794,169 | 8/1998 | Jung et al. ................................. | 701/57 |
| 5,822,708 | 10/1998 | Wagner et al. ........................... | 701/57 |

FOREIGN PATENT DOCUMENTS

| | | |
|---|---|---|
| 0 576 703 A1 | 1/1994 | European Pat. Off. . |
| 42 15 406 A1 | 11/1993 | Germany . |
| 43 34 146 A1 | 4/1994 | Germany . |

*Primary Examiner*—George Dombroske
*Attorney, Agent, or Firm*—Davis and Bujold

[57] ABSTRACT

The invention concerns a gear-change control systems (10) for an automatic transmission (3). Input variables, derived from a driver-vehicle system, are established. Output variables are established by fuzzy logic methods and used to determine a gear-change ratio. A fuzzy logic module, which imitates the operating method of a logical flip-flop and additionally permits continuous intermediate values, is used to consider driving states brought about by different situations.

10 Claims, 2 Drawing Sheets

GEAR-CHANGE CONTROL SYSTEM FOR AN AUTOMATIC TRANSMISSION

The invention relates to a gear-change control system for an automatic transmission and has the features stated in the preamble of the main claim.

DE-A 42 15 406 has disclosed a control system for switching an automatic transmission which works according to fuzzy logic methods. This control system is based on an optimated control system in which all the fuzzy production rules are divided into separate fractions.

Together with driving modes maintained for long periods of time, a series of spontaneous driving modes are conditioned by situations (for example, cornering, short downhill or uphill distances). The fusion of such driving modes conditioned by situations is especially problematic in conventional control systems, since precisely defined start or end positions often cannot be given. For this reason, a threshold inquiry is difficult or impossible to make. Recourse is had, in this case, to time steps or time elements which, of course, cannot be adapted, or can be adapted only at great expense, to the time varying driving modes.

The problem on which this invention is based is to indicate means to be used in a control system, of the above mentioned kind, which allow a simple threshold inquiry for taking driving modes, conditioned by situations, into consideration.

The problem on which the invention is based is solved by the fact that in order to take into consideration situation-conditioned driving modes, a fuzzy logic module is used which imitates the operating method of a logic flip-flop and, in addition, allows continuous intermediate values.

According to the basic principles of the fuzzy logic, the input and output value ranges of this fuzzy-flip-flop are continuous so that the "set" and "release" conditions are provided with a kind of plausibility weight. The output quantity of said fuzzy-flip-flop is thus always a compromise of the existing input quantities which, in turn, can result from a fuzzy control system as flat quantities. Other advantageous designs of the control system, according to the invention, are to be understood from claims 2 to 10.

Herebelow is explained in detail, by way of example with the aid of drawings, the realization of a control system according to the invention involving a fuzzy-flip-flop. In the drawings.

In tying in driving modes conditioned by situations, the fact that precisely defined start and end features (for example, change of the throttle valve position<20%, etc.) often cannot be given is problematic. For this reason, a threshold inquiry is difficult or impossible. In most cases, time steps or time elements are used which can, if at all, be adapted to the time varying conditions only at great expense.

Advantageous here is the use of a fuzzy logic module which imitates the operating method of a logical flip-flop. A realization based on rules or an algorithmic realization, using fuzzy logic methods combined with a system of internal storage of conditions, is possible.

Figure 1:
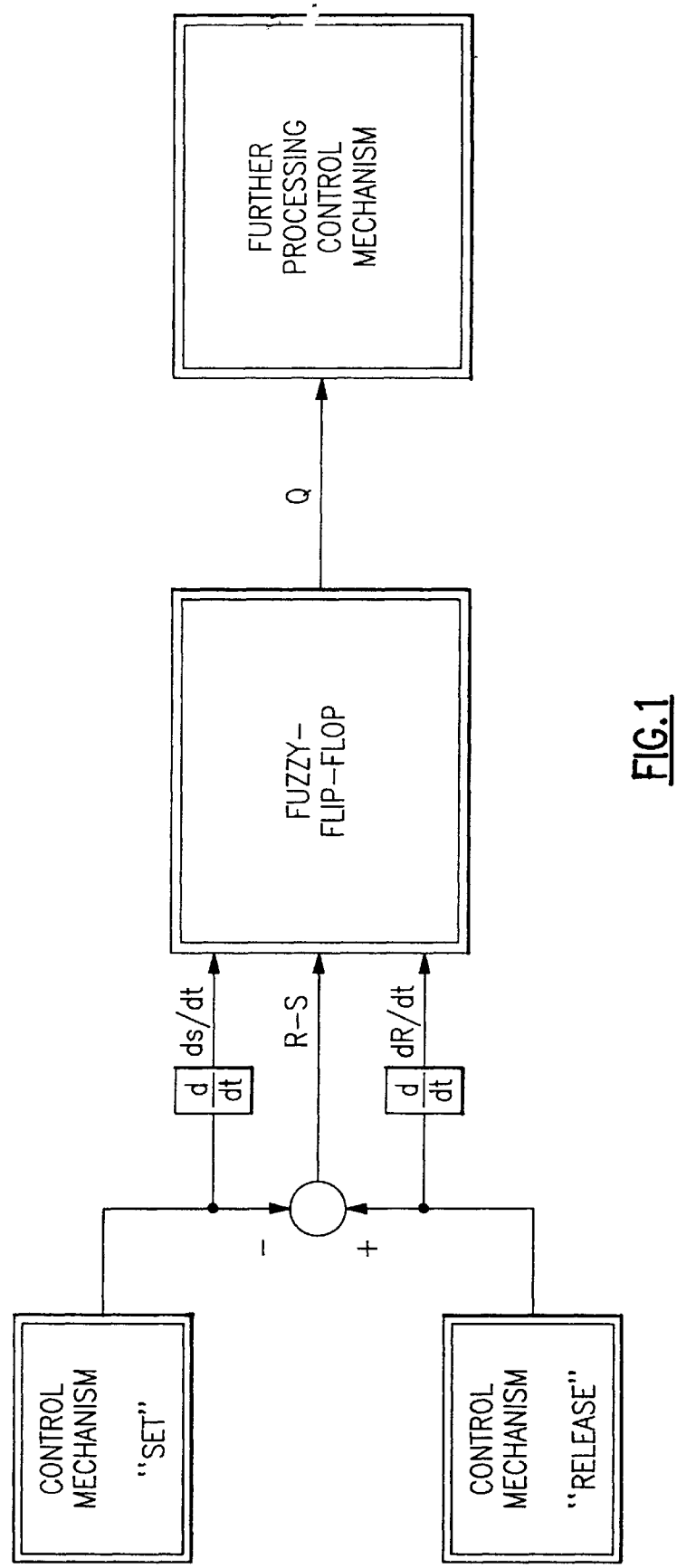
FIG. 1 is a simplified block diagram of a rule-based fuzzy-flip-flop.

The module, according to FIG. 1, has two inputs available by which an event-controlled "set" or "release" output can be given. According to the basic principles of the fuzzy logic, the input and output value ranges of said fuzzy-flip-flop are continuous so that the "set" or "release" modes are provided with a kind of plausibility weight. The output quantity of this fuzzy-flip-flop is thus always a compromise of the existing input quantities which, in turn, are generated again by a fuzzy control system as flat quantities (see FIG. 1). Pursuant to the logical flip-flop, the fuzzy-flip-flop can also issue a fuzzy negation of the output quantity.

The above described system performance of the fuzzy-flip-flop can, in principle, be modelled by different theoretical arrangements.

Figure 2:
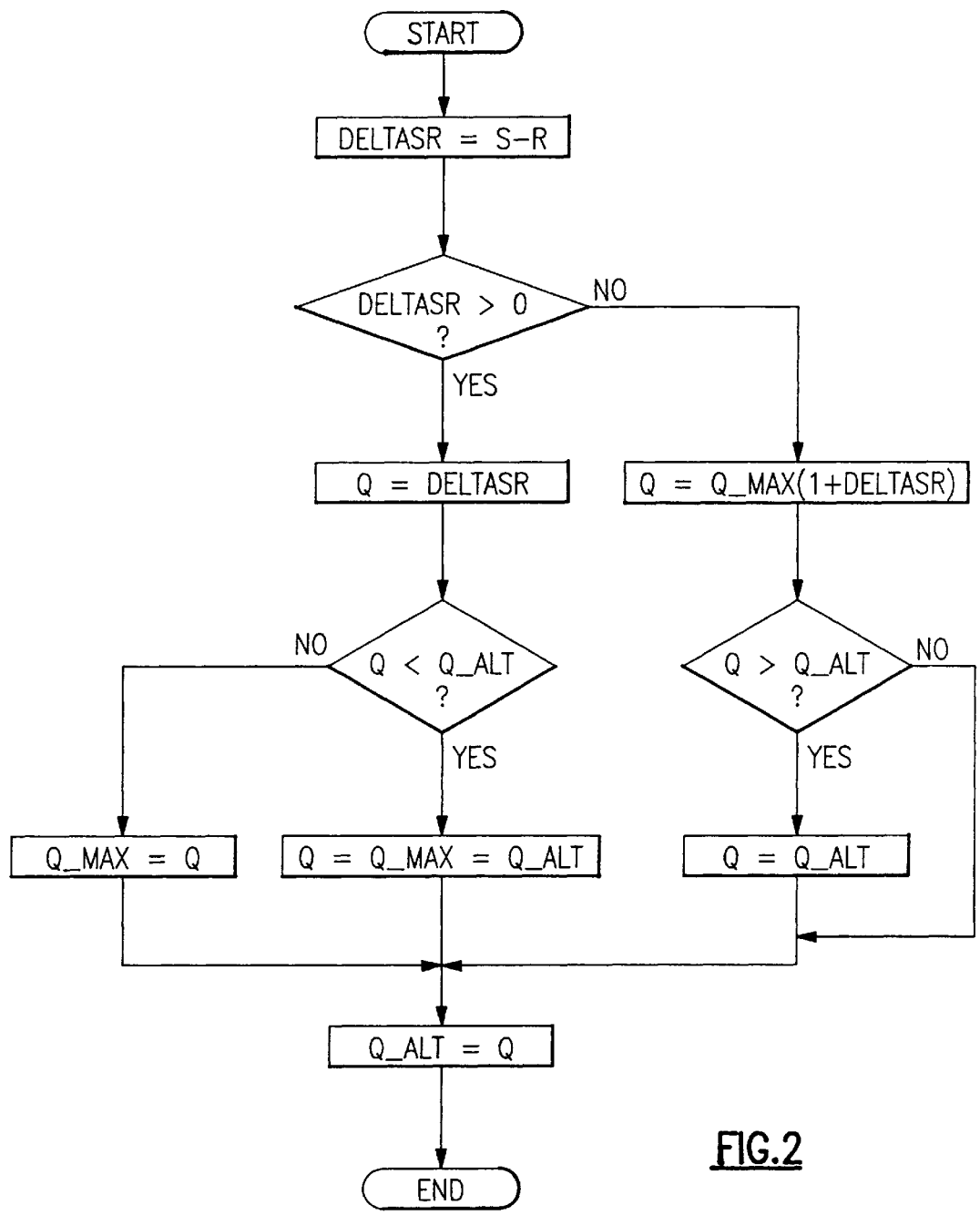
FIG. 2 is a flow chart of a fuzzy-flip-flop with a system performance modelled by an algorithm.

FIG. 2 shows a flow chart, of the operating method of a fuzzy-flip-flop, based on an algorithmic realization. The algorithm used is essentially based on the input quantity $\delta$ SR. This is the difference of the "set" and of the "reset" input. Said difference constitutes a measure for the output value of the fuzzy-flip-flop. With the aid of the $\delta$ SR quantity it is decided whether the operation is a set, hold or reset.

Two other essential quantities $Q\_max$ and $Q\_alt$ represent the system internal storage state. The $Q\_max$ value corresponds to the maximum value of an uninterrupted set operation. Said maximum value is also maintained during a reset phase until the next set phase. After the $\delta$ SR input quantity has been calculated, an inquiry follows of said quantity. If $\delta$ SR>0, the actual Q value is retained for a set operation. In the step that follows, the Q is compared with the old value for a set operation $Q\_alt$. From the comparison it results that a $Q<Q\_alt$, the former set value $Q\_max$ (=$Q\_alt$) still applied or that $Q\_max$ has been now replaced by a higher value for a set operation.

If the input quantity is $\delta$ SR<0, the actual Q value for a set operation is calculated according to the equation $Q=Q\_max (1+\delta SR)$. It is to be observed that the $\delta$ SR value has a negative sign. After the actual value of Q has been calculated, said value is compared with the $Q\_alt$ value. In the case where Q is higher, the old value for a set operation $Q\_alt$ is replaced by the actual value.

The quantitative calculation of the resetting signal is effected by linkage between the $Q\_max$ value and the negative difference derived from the conjunctive fuzzy operators.

The "hold" and "change" states are differentiated by a comparison with the output quantity $Q\_alt$.

In an arrangement based on Rules (FIG. 1), the control system of the fuzzy-flip-flop uses the negative difference $\delta$ RS=$-\delta$ SR=R(K)–S(K) and the changes S-pkt(K)=S(K)–S(K–1) and R–pkt(K)=R(K)–R(K–1) (K=actual scanning step).

The implemented rules deliver, during each scanning step, a statement of plausibility as to whether the output has been changed in a direction to "set" or in a direction to "release". The absolute value of the output change is derived directly from the degree of Plausibility so that a spontaneous, jump-like changes, the same as slow transitions, are equally possible on the output of the fuzzy-flip-flop.

The 6 rules that follow form the core of the fuzzy-flip-flop:

Rule 1 (priority: 1.0; gamma: 0.0):
  When $\delta$ RS small,
  then plausibility set zero (=0)
Rule 2 (priority: 1.0; gamma: 0.0):
  When $\delta$ RS pos-great and R-pkt positive,
  the plausibility set neg-great (=–1)
Rule 3 (priority: 1.0; gamma: 0.0):
  When $\delta$ RS neg-great and S-pkt positive,
  the plausibility set pos-great (=+1)
Rule 4 (priority: 1.0; gamma: 0.0):
  When $\delta$ RS neg-great and R-pkt negative,
  the plausibility set pos-great (=+1)

Rule 5 (priority: 1.0; gamma: 0.0):
   When δ RS pos-great and S-pkt negative,
   the plausibility set neg-great (=−1)

Rule 6 (priority: 1.0; gamma: 0.0):
   When δ RS neg-great and S-pkt negative,
   the plausibility set zero (=0)

The plausibilities resulting from this control system are added up in a subsequent step and thus form a definitive statement of the degree up to which the output is set or reset. In addition, there is the possibility of separately influencing the set or reset characteristic by a non-linear factor. In the present use, a quadratic linkage with the δ RS difference proves advantageous:

$$Q=Q+\delta Q(R-S)^2 \times k$$

The set/release velocity can be controlled by the coded numbers of the control conclusion (singletons). In borderline cases, the performance of a logical flip-flop results with discrete conditions 0 and 1.

In the instant use, the fuzzy-flip-flop is applied together with two fuzzy control systems on the input side in order to eliminate an event-controlled change of gear (upshift/downshift) during certain driving situations, such as cornering.

For this purpose the degree of plausibility on the output of the fuzzy-flip-flop is made available to the fuzzy system, as an input quantity, and can be used as a premise element in any control system.

We claim:

1. A gear-change control system (10) for an automatic transmission (3) having means (9) for detecting input variables derived from a driver-vehicle system, means for producing accessory functions (fuzzy sets) for said input variables, and means for changing gears of the transmission, wherein said means (9) for detecting the input variables and said means for producing accessory functions and said means for changing the gears of the transmission interact so that, according to fuzzy production rules, output variables are detected with which a transmission gear is determined, wherein a fuzzy logic module is used to take into consideration driving modes conditioned by situations, wherein said fuzzy logic module imitates an operating method of a logical flip-flop, the input value ranges and the output value ranges proceed continuously and in consecutive scanning steps, by the implemented rules applied to the input quantities or algorithms, and a statement of a plausibility as to whether the output of the fuzzy logic module changes in a direction to "set", "release" or maintain a finally obtained value is obtained.

2. A system control according to claim 1, wherein the difference of the input quantities constitutes a measure of the change of the output value of the fuzzy logic module.

3. A control system according to claims 1, wherein the input variables abut on the fuzzy-flip-flop: difference δ RS(K)=R(K)−S(K) and the changes S-pkt(K)=S(K)−S(K−1) and R-pkt(K)=R(K)−R(K−1), with K standing for the actual scanning step.

4. A control system according to claim 1, wherein the fuzzy logic module works according to the following rules:

Rule 1:
   When δ RS is small,
   the plausibility is set to zero (=0);

Rule 2:
   When δ RS is positive and great and R-pkt is positive,
   then plausibility is set to negative and great (=−1);

Rule 3:
   When δ RS is negative and great and S-pkt is positive,
   then plausibility is set to positive and great (=+1);

Rule 4:
   When δ RS is negative and great and R-pkt is negative,
   then plausibility is set to positive and great (=+1);

Rule 5:
   When δ RS is positive and great and S-pkt is negative,
   then plausibility is set to negative great (=−1); and Rule 6:
   When δ RS is negative and great and S-pkt is negative,
   then the plausibility is set to zero (=0).

5. A control system according to claim 4, wherein the plausibilities resulting from the rules are added up in a subsequent step to form a statement of a degree to which the output is one of set and reset.

6. A control system according to claim 1, wherein by using the fuzzy logic module an event-controlled gear change is eliminated in certain driving situations.

7. A control system according to claims 1, wherein the fuzzy logic module generates an output variable which constitutes a compromise of existing input variables which, in turn, are generated by a fuzzy control system as flat quantities.

8. A control system according to claims 4, wherein the set and the reset characteristic is separately influenced by a non-linear factor.

9. A control system according to claim 8, wherein the set and the reset characteristics are influenced by a quadratic linkage of the δ RS difference according to the equation: $Q=Q+\delta\ Q\ (R-S)^2 \times k$, where k represents an adaptation factor.

10. A control system according to claim 1, wherein the fuzzy logic module is based on an algorithmic realization.

* * * * *